United States Patent [19]

Huyer

[11] Patent Number: 5,185,562

[45] Date of Patent: Feb. 9, 1993

[54] APPARATUS FOR CONTROLLING POSITION AND TILT OF A SLIDING ROOF PANEL OF A MOTOR VEHICLE

[75] Inventor: Johannes N. Huyer, Velserbroek, Netherlands

[73] Assignee: Vermeulen-Hollandia Octrooien II B.V., Ea Haarlem, Netherlands

[21] Appl. No.: 770,227

[22] Filed: Oct. 2, 1991

[30] Foreign Application Priority Data

Oct. 10, 1990 [NL] Netherlands ............... 9002198

[51] Int. Cl.⁵ ................................. H02P 3/00
[52] U.S. Cl. ................................. 318/466; 318/266; 296/223
[58] Field of Search ............... 318/280–286, 318/264–266, 466–470, 461, 463, 561, 484; 49/26, 28, 141, 118; 296/216, 220–223; 361/23

[56] References Cited

U.S. PATENT DOCUMENTS

| | | | |
|---|---|---|---|
| 4,262,239 | 4/1981 | Kawa | 318/561 |
| 4,364,003 | 12/1982 | Phipps | 318/266 X |
| 4,383,206 | 5/1983 | Matsuoka et al. | 318/466 X |
| 4,498,033 | 2/1985 | Aihara et al. | 318/266 X |
| 4,556,835 | 12/1985 | Vogel et al. | 318/663 |
| 4,563,625 | 1/1986 | Kornbrekke et al. | 318/283 X |
| 4,608,637 | 8/1986 | Okuyama et al. | 364/424 |
| 4,831,509 | 5/1989 | Jones et al. | 318/466 X |
| 4,835,449 | 5/1989 | Huehn | 318/282 |
| 4,874,995 | 10/1989 | Kawai et al. | 318/484 |
| 4,881,020 | 11/1989 | Hida et al. | 318/468 X |
| 4,893,870 | 1/1990 | Moriya et al. | 296/223 |
| 4,910,445 | 3/1990 | Borrmann | 318/468 |
| 4,983,896 | 1/1991 | Sugiyama et al. | 318/466 |

FOREIGN PATENT DOCUMENTS 3401864 8/1985 Fed. Rep. of Germany .

Primary Examiner—A. Jonathan Wysocki
Attorney, Agent, or Firm—Kinney & Lange

[57] ABSTRACT

An apparatus for operating a roof panel (1) of a sliding roof or a sliding/tilting roof having a motor (2) for moving the roof panel, a control unit (8) for energizing the motor and a setting means (11) for setting a desired position of the roof panel. In order to move the roof panel (1) to a desired position indicated by the setting means (11) the control unit (8) determines an energizing period from the expected speed of movement and the starting position of the roof panel (1). The motor (2) has to be energized during this energizing period to reach the desired position. A sensor (9) is provided for detecting the closed position of the roof panel as fixed initial position.

10 Claims, 2 Drawing Sheets

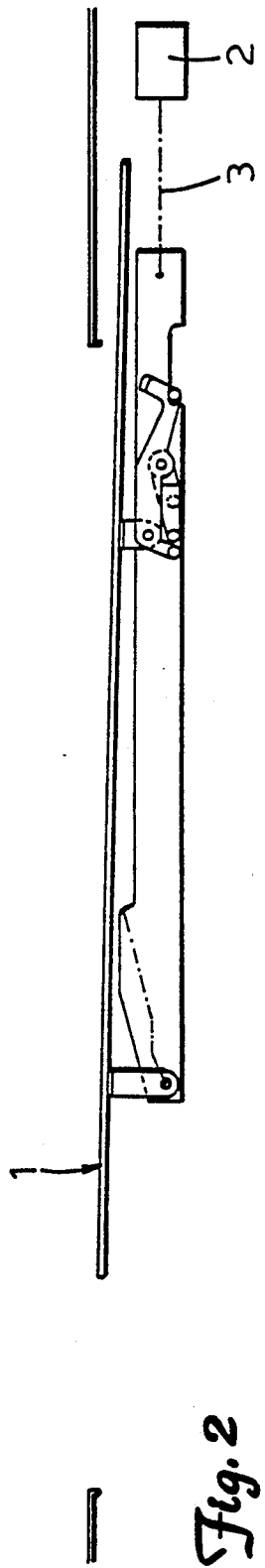
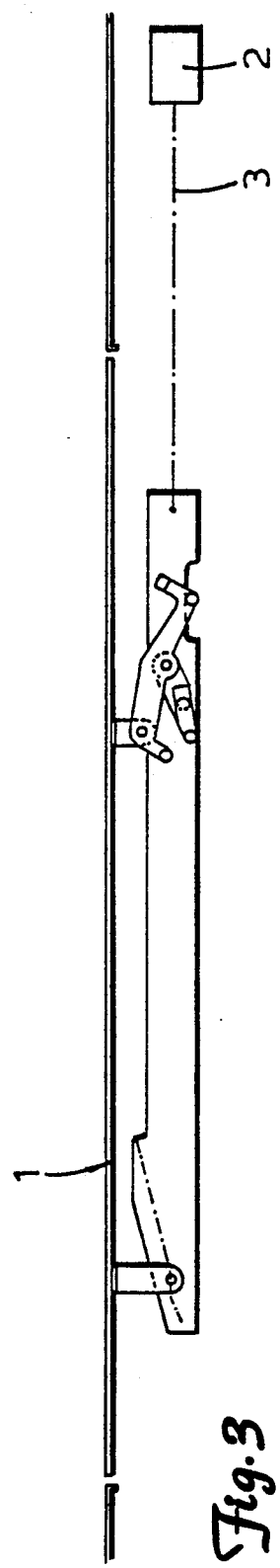
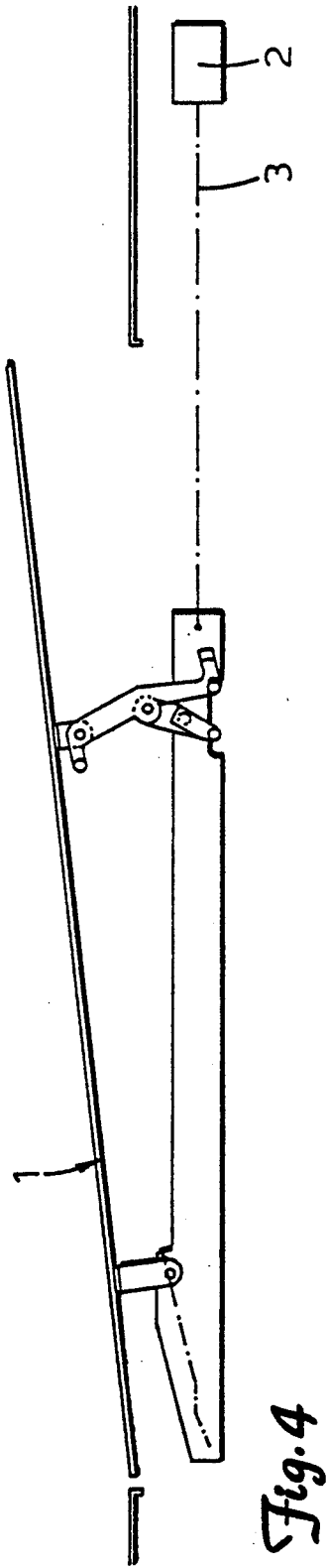
Fig. 2
Fig. 3
Fig. 4

APPARATUS FOR CONTROLLING POSITION AND TILT OF A SLIDING ROOF PANEL OF A MOTOR VEHICLE

BACKGROUND OF THE INVENTION

The invention relates to an apparatus for operating the roof panel of a sliding roof or a sliding/tilting roof, comprising a motor for moving the roof panel, a control unit for energizing the motor and a setting means for setting a desired position of the roof panel.

Such an apparatus is for example known from DE-A-33 24 107. In this known apparatus a closed loop control system is used, wherein the position of the roof panel is continuously measured and the motor is energized until the actual position equals the desired position. Although a good operation of the roof panel is possible with this known apparatus, special measures must be taken in view of the closed loop control to avoid instabilities. To this end the known apparatus is provided with a hysteresis circuit to avoid instabilities around the desired position of the roof panel. Thereby the known apparatus is relatively complicated.

The invention aims to provide a simplified apparatus of the above-mentioned type, by which a sufficiently accurate positioning of the roof panel in the desired position is nevertheless possible.

SUMMARY OF THE INVENTION

To this end the apparatus according to the invention is characterized in that for moving the roof panel to a desired position indicated by a setting means, a control unit determines an energizing period from the expected speed of movement and the position of the roof panel, during which energizing period the motor has to be energized to reach the desired position, whereas a sensor is provided for detecting the closed position of the roof panel as fixed initial position.

The invention is based on the insight that for automatically positioning the roof panel in a desired position by means of the setting means a direct control of the motor for moving the roof panel without closed loop control is sufficient, wherein the energizing period required for reaching the desired position is computed by means of the expected nominal speed of movement taking the closed position of the roof panel as a starting point.

According to a preferred embodiment of the invention a sensor is provided for measuring the speed of movement of the roof panel, wherein the control unit corrects the computed energizing period if the actual speed of movement differs from the expected nominal speed of movement of the roof panel.

In this manner the accuracy for moving the roof panel into the desired position, is increased.

Preferably the apparatus according to the invention is made in such a manner that when putting the apparatus into operation, the closed position is stored in a memory as a fixed initial position, wherein if a signal from the closed position sensor indicating the closed position is absent, the control unit energizes the motor for moving the roof panel from an assumed open sliding or tilting position into the closed position. If after the elapse of a predetermined period without reaching the closed position or jamming of the roof panel in a maximum open position, the control unit then energizes the motor in a reversed direction of rotation until the closed position is reached.

If a so-called non-volatile memory is used, this procedure has to be made only once at the first installation. If a volatile memory is used, this procedure is followed after each temporary interruption of the power supply.

BRIEF DESCRIPTION OF THE DRAWINGS

The invention will be further explained by reference to the drawings in which an embodiment of the apparatus according to the invention is shown very schematically.

FIG. 2 shows very schematically the sliding/tilting roof, wherein the roof panel is in an open sliding position.

FIG. 3 shows the sliding/tilting roof of FIG. 2, wherein the roof panel is in the closed position.

FIG. 4 shows the sliding/tilting roof of FIG. 2, wherein the roof panel is in an open tilting position.

DETAILED DESCRIPTION OF A PREFERRED EMBODIMENT

Figure 1:
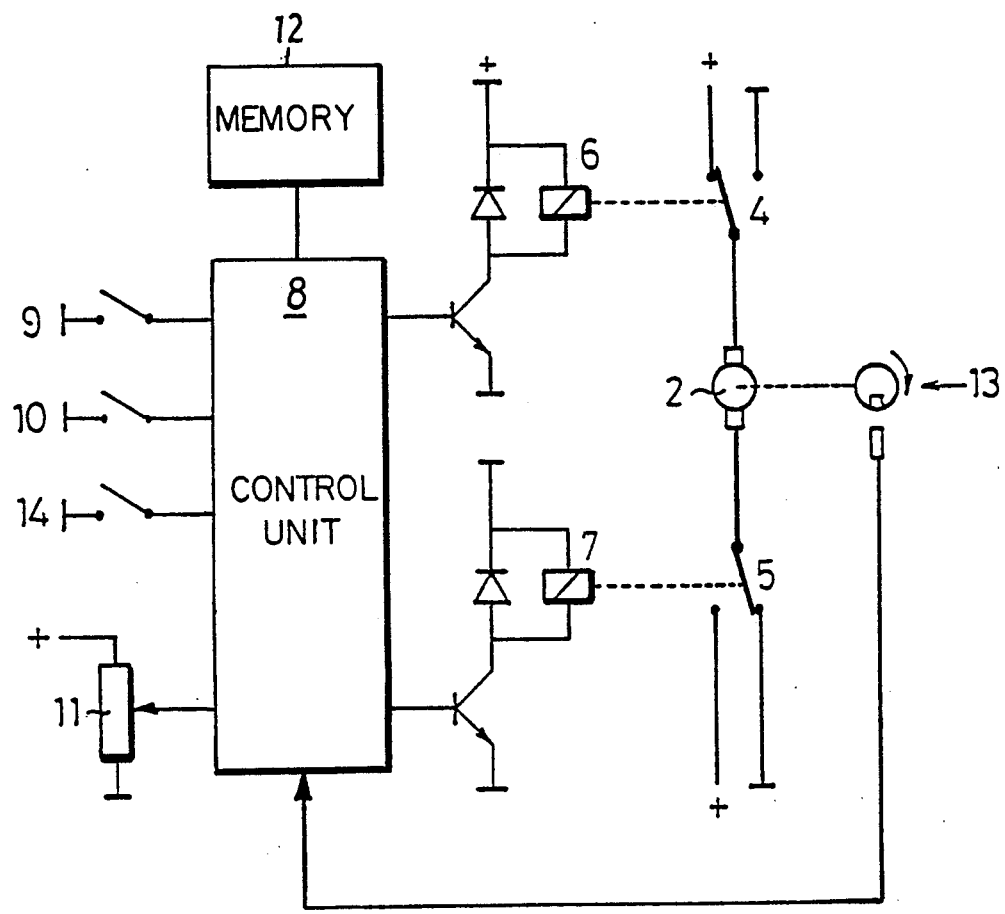
FIG. 1 is very simplified circuit diagram of an embodiment of the apparatus according to the invention.

FIG. 1 shows a very simplified block diagram of an apparatus for operating the roof panel i of a sliding/tilting roof of a vehicle not further shown, which roof panel 1 is shown in several positions in FIG. 2-4. The roof panel 1 can be driven by an electromotor 2 through a suitable cable 3. As shown in FIG. 1, the motor 2 can be connected to the power supply through make-and-break contacts 4 and 5 of relays 6 and 7, so that the motor 2 can be connected to the supply source for rotation in opposite directions. For rotation in one direction from the closed position of the roof panel 1 shown in FIG. 3, the roof panel is slided open, whereas for rotation of the motor 2 in the other direction the roof panel is opened by tilting. For moving the roof panel 1 5 from an open position into the closed position of FIG. 3, the motor 3 is energized in a direction opposite to the one used for reaching the respective open position, so that energizing for closing the roof panel 1 from the open position of FIG. 2 reached by sliding, corresponds with energizing the motor 2 for opening by tilting from the closed position. Vice versa, energizing the motor 2 for closing the roof panel 1 from the open tilting position of FIG. 4 corresponds with energizing the motor 2 for sliding open from the closed position of FIG. 3.

The apparatus shown in FIG. 1 comprises a control unit 8 adapted to energize the relays 6, 7 through suitable transistors in order to energize the motor 2. A switch 9 is connected to the control unit 8 functioning as a sensor for detecting the closed position of the roof panel 1 according to FIG. 3. Further a manually operable switch 10 is connected to the control unit 8, by means of which the tilting or sliding mode of the roof panel 1 can be chosen. By means of a setting means made as a potentiometer 11, a desired position of the roof panel 1 can be supplied to the control unit 8.

The operation of the described control unit is as follows.

It is assumed that the roof panel 1 is in the closed position of FIG. 3. This position is signalled by the switch 9 to the control unit 8 and is stored by the control unit in a memory 12 as initial position. If one chooses with the selector switch 10 for example for sliding and a certain desired position is indicated by the setting means 11, the control unit 8 computes the energizing period required for reaching the desired position from the value set with the setting means 11 and the predetermined nominal speed of movement of the roof panel 1, during which energizing period the motor 2 must be energized to move the roof panel 1 from the initial position in said desired position. Subsequently the control unit energizes the corresponding relay 6 or 7, whereafter the roof panel is driven by the motor 2 during the computed energizing period. After elapse of this period the motor is de-energized. The reached position is stored in the memory 12 so that the control unit at choosing another desired position with the setting means 11, taking this new initial position as a starting point, can compute an energizing period corresponding with this new position.

In order to compensate for a difference between the actual speed of movement and the predetermined speed of movement of the roof panel 1, a speed sensor 13 is mounted, which supplies a signal to the control unit 8 corresponding to the speed of the motor 2, and therefore, of the roof panel 1. If the actual speed differs from the predetermined speed of movement, the energizing period of the motor 2 is corrected for this difference.

Moreover a safety against jamming of the roof panel 1 can be realized by means of this speed sensor 13 in a simple manner. If the control unit 8 determines during energizing the motor 2 that the speed of movement of the roof panel falls below a predetermined minimum speed, the motor 2 is de-energized immediately. Further the control unit 8 de-energizes the motor 2 if the signal of the movement sensor 13 shows that a deceleration of the roof panel 1 occurs which exceeds a predetermined maximum value. In both cases the control unit 8 subsequently energizes the motor 2 in a reversed direction so that the roof panel 1 is moved backwards along a small distance and undesired strain tensions in the driving mechanism are neutralized in any case. As an alternative it is also possible to energize the motor 2 in a reversed direction until the point of departure of the roof panel 1 is reached again. When the roof panel 1 is moved in the direction of the closed position of FIG. 3, the safety based on the deceleration of the roof panel 1 is switched off at a short distance from the closed position.

A switch 14 is connected to the control unit 8, by means of which the user may switch on or off an automatic closing function. If the automatic closing function is switched on, the control unit 8 provides for an automatic movement of the roof panel 1 into the closed position automatically at switching off the ignition of the corresponding vehicle.

The apparatus described shows the advantage that the control unit is made relatively simple due to the absence of closed control loops and because no special provisions are required for preventing instabilities caused by such control loops.

As there is no position sensor for the roof panel 1, there is no information on the actual position of the roof panel 1 available for the control unit 8 at the installation of the apparatus or at an interruption of the power supply. If the roof panel 1 in the closed position when the apparatus is put into operation, the switch 9 signals this closed position to the control unit 8 so that the control unit can store this closed position as fixed initial position in the memory 12. However, if the signal of switch 9 shows that the roof panel is not in the closed position, the position of the roof panel 1 is unknown. In this case, the control unit 8 assumes that the roof panel is in an open tilting position. The control unit 8 now automatically energizes the motor 2 in such a manner that the roof panel 1 is moved from the open tilting position into the closed position. However, the control unit 8 only starts this automatic energizing after operating one of the manually operable actuating means 10, 11, 14 by the user in order to avoid unsafe situations. As soon as the switch 9 signals to the control unit 8 that the closed position is reached, the control unit 8 de-energizes the motor 2 and the closed position is stored in the memory 12.

When after the elapse of a predetermined energizing period substantially corresponding with the period required for traversing the total tilting way, the control unit 8 determines that the closed position has not yet been reached, the closing unit energizes the motor 2 in reversed, direction until the closed position is reached, which will be signalled by the switch 9. Energizing in the reversed direction also takes place if the control unit 8, within the predetermined energizing period, determines from the signal of the movement sensor 13 that the roof panel 1 is apparently jammed in the extreme open sliding position.

When the control unit 8 has stored the closed position as fixed initial position in the memory 12, the apparatus is ready for normal use.

It is noted that the described procedure for storing the closed position as a fixed initial position, in, foe example using a so-called non-volatile memory, is only to be followed when first put into operation.

Although in the described procedure for storing the closed position, the control unit 8 assumes that the roof panel 1 is in an open tilting position, the control unit 8 may also assume an open sliding position, if desired. However, assuming an open tilting position has the advantage that the energizing period required for reaching the closed position is shorter than in case of assuming an open sliding position.

The described procedure for storing the closed position can also be used in an apparatus with a position sensor for calibrating the position of the respective position sensor corresponding with the closed position.

Finally it is noted that the velocity sensor 13 can be made in several ways, for example by means of a Hall element.

The invention is not restricted to the above-described embodiment which can be varied in a number of ways within the scope of the invention.

I claim:

1. Apparatus for operating the roof panel of a sliding roof or a sliding/tilting roof, comprising a motor for moving the roof panel, a control unit for energizing the motor and a setting means for setting a desired position of the roof panel within a range of possible positions of said roof panel, wherein for moving the roof panel to the desired position indicated by the setting means, the control unit computes an energizing period from the expected speed of movement and the position of the roof panel, during which energizing period the motor has to be energized to reach the desired position, whereas a sensor is provided for detecting the closed position of the roof panel as a fixed initial position.

2. Apparatus according to claim 1, further comprising a sensor for measuring the speed of movement of the roof panel, wherein the control unit corrects the computed energizing period if the actual speed of movement differs from the expected nominal speed of movement of the roof panel.

3. Apparatus according to claim 2, wherein during the energizing period of the motor the control unit de-energizes the motor if the speed of movement falls below a predetermined minimum speed and/or a deceleration of the roof panel occurs which exceeds a predetermined maximum value.

4. Apparatus according to claim 3, wherein during an energizing period of the motor for moving the roof panel into the closed position, the control unit maintains the energizing until the roof panel is in its closed position as soon as the roof panel is within a predetermined distance from the closed position.

5. Apparatus according to claim 3, wherein the control unit energizes the motor in the reversed direction of rotation during a short period after said de-energizing of the motor.

6. Apparatus according to claim 3, wherein after said de-energizing, the control unit energizes the motor in the reversed direction of rotation until the roof panel is returned to a point of departure for the energizing period.

7. Apparatus preferably according to claim 1, wherein when putting the apparatus into operation, the closed position is stored in a memory as the fixed initial position, wherein if a signal from the closed position sensor indicating the closed position is absent, the control unit energizes the motor for moving the roof panel from an assumed open sliding or tilting position into the closed position, wherein after elapse of a predetermined period without reaching the closed position or jamming of the roof panel in a maximum open position, the control unit energizes the motor in a reversed direction of rotation until the closed position is reached.

8. Apparatus according to claim 7, wherein after putting the apparatus into operation, the control unit only energizes the motor for moving the roof panel into the closed position after operating a setting means.

9. Apparatus according to claim 7 or 8, wherein for moving the roof panel the control unit assumes that the roof panel is in an open tilting position.

10. The apparatus according to claim 1 wherein said setting means is accomplished in a single manual operation.

* * * * *